(12) United States Patent
Heo et al.

(10) Patent No.: US 9,830,074 B2
(45) Date of Patent: Nov. 28, 2017

(54) TOUCH SCREEN DEVICE AND CHARACTER INPUT METHOD THEREOF

(71) Applicant: LG ELECTRONICS INC., Seoul (KR)

(72) Inventors: U-Beom Heo, Seoul-si (KR); Jeong-Hee Ahn, Suwon-si (KR); Joo-Ho Lee, Seoul-si (KR); Kyung-Wook Park, Yongin-si (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 14/543,390

(22) Filed: Nov. 17, 2014

(65) Prior Publication Data

US 2015/0074587 A1    Mar. 12, 2015

Related U.S. Application Data

(63) Continuation of application No. 12/234,329, filed on Sep. 19, 2008, now Pat. No. 8,902,169.

(30) Foreign Application Priority Data

Oct. 2, 2007    (KR) .................. 10-2007-0099473

(51) Int. Cl.
   *G06F 3/0488*    (2013.01)
   *G06F 3/0482*    (2013.01)

(52) U.S. Cl.
   CPC ........ *G06F 3/04886* (2013.01); *G06F 3/0482* (2013.01)

(58) Field of Classification Search
   CPC ..................... G06F 3/0482; G06F 3/04886
   See application file for complete search history.

(56) References Cited

U.S. PATENT DOCUMENTS 5,805,167 A    9/1998    Van Cruyningen
6,271,835 B1   8/2001    Hoeksma
(Continued)

FOREIGN PATENT DOCUMENTS

WO    WO 03/005179 A1    1/2003
WO    WO 2005/041020 A1  5/2005

OTHER PUBLICATIONS

John Gruber, iPhone 1.1.1 Keyboard Accents, Sep. 28, 2007, flickr, available at http://www.flickr.com/photos/gruber/1451602466/.

*Primary Examiner* — Vijay Shankar
*Assistant Examiner* — Abhishek Sarma
(74) *Attorney, Agent, or Firm* — Birch, Stewart, Kolasch & Birch, LLP

(57) ABSTRACT

A method of controlling a mobile terminal, and which includes displaying a touch keypad on a touch screen of the mobile terminal, the touch keypad including character input regions, at least one specific character input region including a first character symbol and a second character symbol; displaying an output window above the touch keypad, the output window displaying character symbols touched on the character input regions; receiving a touch selection signal indicating a touch selection of the specific character input region; as long as the received touch selection signal is received, displaying the keypad and a new character input region with the second character symbol being displayed larger than the second character symbol displayed in the specific character input region; and displaying the second character symbol in the output window when the touch selection is released from the new character input region.

12 Claims, 17 Drawing Sheets

(56) References Cited

U.S. PATENT DOCUMENTS

| | | |
|---|---|---|
| 6,980,200 B2 | 12/2005 | Goren |
| 2002/0030843 A1* | 3/2002 | Tuli .................. G06F 17/30899 358/1.15 |
| 2003/0025616 A1* | 2/2003 | Bickerton ............. G06F 3/0236 341/22 |
| 2004/0021696 A1 | 2/2004 | Molgaard |
| 2006/0274051 A1 | 12/2006 | Longe et al. |
| 2007/0040813 A1 | 2/2007 | Kushler et al. |
| 2007/0152978 A1 | 7/2007 | Kocienda et al. |
| 2007/0229476 A1* | 10/2007 | Huh .................... G06F 3/04886 345/173 |
| 2009/0058823 A1 | 3/2009 | Kocienda |

\* cited by examiner

TOUCH SCREEN DEVICE AND CHARACTER INPUT METHOD THEREOF

CROSS REFERENCE TO RELATED APPLICATIONS

The present application is a continuation of co-pending application Ser. No. 12/234,329, filed on Sep. 19, 2008, which claims priority to Korean Patent Application KR 10-2007-0099473, filed on Oct. 2, 2007, the entire contents of which are being incorporated herein by reference.

BACKGROUND OF THE INVENTION

1. Field of the Invention

The present invention relates to a device, computer program product and method of inputting a character in a touch screen device, and more specifically, to a method of inputting a character, in which a touch area is partitioned into a plurality of array positions, and one or more characters are assigned to each of the partitioned array positions, so that if one of the partitioned array positions is touched, the characters assigned to the touched array positions are enlarged and rearranged on the touch screen to allow a user to select an input character.

2. Description of the Related Art

As portable electronic devices are miniaturized in size and in pursuit of a simple design recently, the portable electronic devices are gradually provided with a touch screen in place of mechanical key buttons that require a certain fixed space.

Positions and settings of input buttons of an input device using a touch screen may be freely set or modified.

Accordingly, recently manufactured portable electronic devices receive most of inputs through a touch pad, except only a minimum button inputs. Inputting characters is not an exception, and input of characters is also accomplished by touching the touch screen. When characters are inputted through a conventional touch screen, all characters are arranged on the touch screen, and a character touched by a user is inputted among the arranged characters.

However, the prior art described above has following problems.

That is, since the characters are many in number, and thus the width of the touch screen occupied by a character is narrow if all the characters are arranged on the touch screen, there is a problem in that readability of the characters is lowered and it becomes also difficult to arrange the characters. Furthermore, since a touch area occupied by a character is narrow according to the prior art, when a user who desires to input the character inputs the character, the user may touch adjacent other characters together and generate an input error, or may suffer from incorrect touches in using the touch screen.

SUMMARY OF THE INVENTION

The present invention is conceived to solve the aforementioned problems in the prior art. An object of the present invention is to provide a touch screen device, a computer program product and a method of inputting a character therein, in which input of characters is accomplished in multiple steps making use of versatility of the touch screen.

Another object of the present invention is to provide a touch screen device, a computer program product and a method of inputting a character therein, in which representative characters are arranged on the touch screen, and when one of the representative characters is selected, characters subordinated to the selected character are displayed to receive a character.

According to an aspect of the present invention for achieving the objects, there is provided a device, computer program product and method of inputting a character on a touch screen receiving a character by sensing a touch of a touch panel. The method comprises the steps of: partitioning a touch area of the touch panel into a plurality of array positions and assigning one or more characters to each of the partitioned array positions; sensing an expansion event of selecting one among the array positions; dividing the touch area into a plurality of selection positions and assigning the characters assigned to the array position selected by the expansion event to the respective selection positions; sensing a selection event of selecting one among the selection positions; and recognizing the character assigned to the selection position selected by the selection event as an input character.

At this time, the expansion event may be generated by a touch input of the user, and the selection event is generated by a release of the touch.

Also, the expansion event and the selection event may be generated by a touch input of the user.

In addition, if the selection event is generated on the touch panel out of the selection positions, the selection event may be recognized as a command for canceling input of a character.

At this time, the array positions may be formed by dividing the touch area into a matrix form of n×m.

In addition, if two or more characters are assigned to the selection positions, the selection positions may be formed to expand in directions including one or more of up, down, left and right sides front a position where the expansion event is generated.

At this time, n and m are 3, respectively; and in the array positions (AP), three or less characters may be assigned to AP(1, 1), four or less characters may be assigned to AP(1, 2), three or less characters may be assigned to AP(1, 3), four or less characters may be assigned to AP(2, 1), five or less characters may be assigned to AP(2, 2), four or less characters may be assigned to AP(2, 3), three or less characters may be assigned to AP(3, 1), four or less characters may be assigned to AP(3, 2), and three or less characters may be assigned to AP(3, 3).

In addition, the selection positions may be formed at the position of AP(1, 1) and to expand to the down and right sides therefrom if the expansion event is generated at AP(1, 1); at the position of AP(1, 2) and to the down, left and right sides therefrom if the expansion event, is generated at AP(1, 2); at the position of AP(1, 3) and to the down and left sides therefrom if the expansion event is generated at AP(1, 3); at the position of AP(2, 1) and to the up, down and right sides therefrom if the expansion event is generated at AP(2, 1); at the position of AP(2, 2) and to the up, down, left and right sides therefrom if the expansion event is generated at AP(2, 2); at the position of AP(2, 3) and to the up, down and left sides therefrom if the expansion event is generated at AP(2, 3); at the position of AP(3, 1) and to the up and right sides therefrom if the expansion event is generated at AP(3, 1); at the position of AP(3, 2) and to the up, left and right sides therefrom if the expansion event is generated at AP(3, 2); and at the position of AP(3, 3) and to the up and left sides therefrom if the expansion event is generated at AP(3, 3).

The input character is a Korean letter, and Korean consonants and vowels may be sequentially assigned to the array positions.

Here, ㄱ, ㅋ and ㄲ may be assigned to AP(1, 1); ㄴ, ㄷ, ㅌ and ㄸ may be assigned to AP(1, 2); ㅣ, ㅐ and ㅒ may be assigned to AP(1, 3); ㄹ, ㅂ, ㅍ and ㅃ may be assigned to AP(2, 1); ㅅ, ㅈ, ㅊ, ㅆ and ㅉ may be assigned to AP(2, 2); ㅗ, ㅜ, ㅛ and ㅠ may be assigned to AP(2, 3); ㅇ, ㅁ and ㅎ may be assigned to AP(3, 1); ㅏ, ㅓ, ㅑ and ㅕ may be assigned to AP(3, 2); and ㅡ, and ㅖ ㅔ may be assigned to AP(3, 3).

In the meantime, n and m are 2, respectively; and in the array positions (AP), three or less characters may be assigned to AP(1, 1), three or less characters may be assigned to AP(1, 2), three or less characters may be assigned to AP(2, 1), and three or less characters may be assigned to AP(2, 2)

At this time, the input character is a numeral, and Arabic numerals may be sequentially assigned to the array positions.

Then, in the array positions (AP), 1, 2 and 3 may be assigned to AP(1, 1); 4, 5 and 6 may be assigned to AP(1, 2); 7, 8 and 9 may be assigned to AP(2, 1); and 0 may be assigned to AP(2, 2).

In the meantime, if two or more characters are assigned to the selection position, the selection position may be formed to expand in directions including one or more of up, down and left sides from a position where the expansion event is generated.

Here, n and m are 3, respectively; and in the array positions (AP), two or less characters may be assigned to AP(1, 1), three or less characters may be assigned to AP(1, 2), three or less characters may be assigned to AP(1, 3), three or less characters may be assigned to AP(2, 1), four or less characters may be assigned to AP(2, 2), four or less characters may be assigned to AP(2, 3), two or less characters may be assigned to AP(3, 1), three or less characters may be assigned to AP(3, 2), and three or less characters may be assigned to AP(3, 3).

Then, the selection positions may be formed at the position of AP(1, 1) and to expand to the down side therefrom if the expansion event is generated at AP(1, 1); at the position of AP(1, 2) and to the left and down sides therefrom if the expansion event is generated at AP(1, 2); at the position of AP(1, 3) and to the left and down sides therefrom if the expansion event is generated at AP(1, 3); at the position of AP(2, 1) and to the up and down sides therefrom if the expansion event is generated at AP(2, 1); at the position of AP(2, 2) and to the up, down and left sides therefrom if the expansion event is generated at AP(2, 2); at the position of AP(2, 3) and to the up, down and left sides therefrom if the expansion event is generated at AP(2, 3); at the position of AP(3, 1) and to the up side therefrom if the expansion event is generated at AP(3, 1); at the position of AP(3, 2) and to the up and left sides therefrom if the expansion event is generated at AP(3, 2); and at the position of AP(3, 3) and to the up and left sides therefrom if the expansion event is generated at AP(3, 3).

In addition, the input character is an English letter, and English letters may be assigned to the array positions in sequence of a QWERTY array.

Then, in the array positions, Q and W may be assigned to AP(1, 1); E, R and T may be assigned to AP(1, 2); Y, U and I may be assigned to AP(1, 3); O, P and A may be assigned to AP(2, 1); S, D, and G may be assigned to AP(2, 2); H, J, K and L may be assigned to AP(2, 3); Z and X may be assigned to AP(3, 1); C, V and B may be assigned to AP(3, 2); and N and M may be assigned to AP(3, 3).

Further, in the array positions, ㄱ and ㅋ may be assigned to AP(1, 1); ㄴ and ㄷ may be assigned to AP(1, 2); ㅌ and ㅍ may be assigned to AP(1, 3); ㄹ, ㅁ and ㅂ may be assigned to AP(2, 1); ㅏ, ㅓ, ㅑ and ㅕ may be assigned to AP(2, 2); ㅗ, ㅜ, ㅛ and ㅣ, ㅐ may be assigned to AP(2, 3); ㅇ and ㅎ may be assigned to AP(3, 1); ㅅ, ㅈ and ㅊ may be assigned to AP(3, 2); and ㅡ and ㅣ may be assigned to AP(3, 3).

In the meantime, if two or more characters are assigned to the selection position, the selection position may be formed to expand in directions including one or more of up, left and right sides from a position where the expansion event is generated.

Then, n and m are 3, respectively; and in the array positions 70, two or less letters may be assigned to AP(1, 1), three or less letters may be assigned to AP(1, 2), two or less letters may be assigned to AP(1, 3), three or less letters may be assigned to AP(2, 1), four or less letters may be assigned to AP(2, 2), three or less letters may be assigned to AP(2, 3), three or less letters may be assigned to AP(3, 1), four or less letters may be assigned to AP(3, 2), and two or less letters may be assigned to AP(3, 3).

Then, the selection positions may be formed at the position of AP(1, 1) and to expand to the right side therefrom if the expansion event is generated at AP(1, 1); at the position of AP(1, 2) and to the left and right sides therefrom if the expansion event is generated at AP(1, 2); at the position of AP(1, 3) and to the left side therefrom if the expansion event is generated at AP(1, 3); at the position of AP(2, 1) and to the up and right sides therefrom if the expansion event is generated at AP(2, 1); at the position of AP(2, 2) and to the up, left and right sides therefrom if the expansion event is generated at AP(2, 2); at the position of AP(2, 3) and to the up and left sides therefrom if the expansion event is generated at AP(2, 3); at the position of AP(3, 1) and to the up and right sides therefrom if the expansion event is generated at AP(3, 1); at the position of AP(3, 2) and to the up, left and right sides therefrom if the expansion event is generated at AP(3, 2); and at the position of AP(3, 3) and to the left side therefrom if the expansion event is generated at AP(3, 3).

At this time, in the array positions, Q and W may be assigned to AP(i, 1); E, R and T may be assigned to AP(1, 2); Y and U may be assigned to AP(1, 3); I, O and P may be assigned to AP(2, 1); A, S, D and F may be assigned to AP(2, 2); G, H and J may be assigned to AP(2, 3); K, L and Z may be assigned to AP(3, 1); X, C, V and B may be assigned to AP(3, 2); and N and M may be assigned to AP(3, 3).

Alternatively, in the array positions, ㄱ and ㅋ may be assigned to AP(1, 1); ㄴ and ㄷ may be assigned to AP(1, 2); ㅌ and ㅍ may be assigned to AP(1, 3); ㄹ, ㅁ and ㅂ may be assigned to AP(2, 1); ㅏ, ㅓ, ㅑ and ㅕ may be assigned to AP(2, 2); ㅅ, ㅈ and ㅊ may be assigned to AP(2, 3); ㅇ and ㅎ may be assigned to AP(3, 1); ㅗ, ㅜ, ㅛ and ㅠ may be assigned to AP(3, 2); and ㅡ and ㅣ may be assigned to AP(3, 3).

In addition, n and m are 3, respectively; three or less letters may be assigned to AP(1, 1), four or less letters may be assigned to AP(i, 2), three or less letters may be assigned to AP(1, 3), two or less letters may be assigned to AP(2, 1), four or less letters may be assigned to AP(2, 2), three or less letters may be assigned to AP(2, 3), two or less letters may be assigned to AP(3, 1), three or less letters may be assigned to AP(3, 2), and two or less letters may be assigned to AP(3, 3).

Then, the selection positions 90 may be formed at the position of AP(1, 1) and to expand to the up and right sides therefrom if the expansion event is generated at AP(1, 1); at the position of AP(1, 2) and to the up, left and right sides therefrom if the expansion event is generated at AP(1, 2); at the position of AP(1, 3) and to the up and left sides therefrom if the expansion event is generated at AP(1, 3); at the position of AP(2, 1) and to the up side therefrom if the expansion event is generated at AP(2, 1); at the position of AP(2, 2) and to the up, left and right sides therefrom if the expansion event is generated at AP(2, 2); at the position of AP(2, 3) and to the up and left sides therefrom if the expansion event is generated at AP(2, 3); at the position of AP(3, 1) and to the up side therefrom if the expansion event is generated at AP(3, 1); at the position of AP(3, 2) and to the up and left sides therefrom if the expansion event is generated at AP(3, 2); and at the position of AP(3, 3) and to the up side therefrom if the expansion event is generated at AP(3, 3).

At this time, in the array positions, Q, W and E may be assigned to AP(1, 1); R, T, Y and U may be assigned to AP(1, 2); I, O and P may be assigned to AP(1, 3); A and S may be assigned to AP(2, 1); D, F, G and H may be assigned to AP(2, 2); J, K and L may be assigned to AP(2, 3); Z and X may be assigned to AP(3, 1); C, V and B may be assigned to AP(3, 2); and N and M may be assigned to AP(3, 3).

In addition, n and m are respectively 3, and one character may be assigned to AP(1, 1), two or less letters may be assigned to AP(1, 2), two or less letters may be assigned to AP(1, 3), two or less letters may be assigned to AP(2, 1), three or less letters may be assigned to AP(2, 2), two or less letters may be assigned to AP(2, 3), two or less letters may be assigned to AP(3, 1), four or less letters may be assigned to AP(3, 2), and three or less letters may be assigned to AP(3, 3).

Then, the selection position may be the position of AP(1, 1) if the expansion event is generated at AP(1, 1); and the selection positions may be formed at the position of AP(1, 2) and to expand to the left side therefrom if the expansion event is generated at AP(1, 2); at the position of AP(1, 3) and to the left side therefrom if the expansion event is generated at AP(1, 3); at the position of AP(2, 1) and to the left side therefrom if the expansion event is generated at AP(2, 1); at the position of AP(2, 2) and to the up and left sides therefrom if the expansion event is generated at AP(2, 2); at the position of AP(2, 3) and to the left side therefrom if the expansion event is generated at AP(2, 3); at the position of AP(3, 1) and to the up side therefrom if the expansion event is generated at AP(3, 1); at the position of AP(3, 2) and to the up, left, and right sides therefrom if the expansion event is generated at AP(3, 2); and at the position of AP(3, 3) and to the up and left sides therefrom if the expansion event is generated at AP(3, 3).

At this time, in the array positions, an "Add a stroke" button may be assigned to AP(1, 1); ㅏ and ㅓ may be assigned to AP(1, 2); ㅗ and ㅜ may be assigned to AP(1, 3); ㄱ and ㅋ may be assigned to AP(2, 1); ㄴ, ㄷ and ㄸ may be assigned to AP(2, 2); ㅡ and ㅣ may be assigned to AP(2, 3); ㅁ and ㅇ may be assigned to AP(3, 1); ㅅ, ㅈ, ㅊ and ㅆ may be assigned to AP(3, 2); and ㄹ, ㅂ and ㅃ may be assigned to AP(3, 3).

In the meantime, the present invention provides a method of inputting a character on a touch screen receiving a character by sensing a touch of a touch panel. The method comprises the steps of: partitioning a touch area of the touch screen into a plurality of array positions and assigning one or more characters to each of the partitioned array positions; enlarging and rearranging the characters, which are assigned to one of the partitioned array positions selected by a user, on the touch screen; and recognizing one of the rearranged characters reselected by the user as an input character.

In addition, the assigned characters may be arranged in the partitioned array position so that one of the characters is arranged at a center and the other characters are arranged at one or more positions of up, down, left and right sides of the character arranged at the center.

At this time, the character arranged at the center may be set to be larger than the other characters within the same partitioned array position in common.

Further, the expansion may be performed from the character arranged at the center in directions where the other characters are arranged.

Furthermore, the rearrangement of characters may be performed so that one of the characters is arranged in each of the expanding directions.

In addition, the present invention provides a touch screen device, which comprises: a touch panel controller for sensing a touch and a touch release of a touch panel; a display controller for outputting an image of a character corresponding to the touch or touch release on a screen; and a control unit for receiving a result of the sensing from the touch panel controller and controlling the display controller to output an image of a character corresponding to the result of the sensing, and receiving the corresponding character depending on the result of the sensing, wherein the control unit partitions a touch area of the touch screen into a plurality of array positions to assign one or more characters to each of the partitioned array positions, rearranges the characters, which are assigned to one of the partitioned array positions selected by a user, on the touch screen, and recognizes one of the rearranged characters reselected by the user as an input character.

According to the touch screen device and the method of inputting a character therein according to the present invention described above, the following effects can be expected.

That is, since only representative characters are initially arranged and displayed on the touch screen, a touch area assigned to a character is widened, and thus it is advantageous in that readability of characters of a user is enhanced.

Furthermore, since a touch area assigned to a character is widened as described above, the present invention has an advantage in that an input error occurring by touching a character together with adjacent characters can be prevented when a user inputs the character.

DESCRIPTION OF THE PREFERRED EMBODIMENTS

Hereinafter, a specific embodiment of the touch screen device and the method of inputting a character therein according to the present invention described above will be described in detail with reference to the accompanying drawings.

Figure 1:
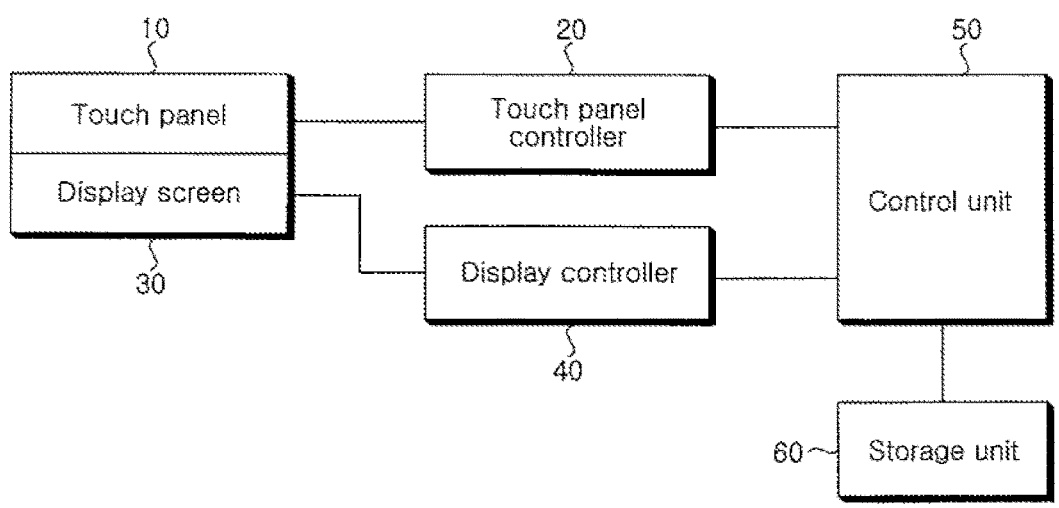
FIG. 1 is a block diagram showing the configuration of a touch screen device according to a specific embodiment of the present invention.

FIG. 1 is a block diagram showing the configuration of a touch screen device according to a specific embodiment of the present invention.

As shown in the figure, the touch screen device of the present invention is provided with a touch panel 10 for sensing a touch of a user. The touch panel 10 may be a variety of known touch panels of a piezoelectric type, capacitive type, or the like.

Then, the touch panel 10 is connected with a touch panel controller 20 for sensing a touch on the touch panel 10 and the position of the touch and controlling the operation of the touch panel 10. That is, if there is a touch input of a user on the touch panel 10, the touch panel 10 converts the touch into an electrical signal and transfers the electrical signal to the touch panel controller 20, and the touch panel controller 20 recognizes the touch input (including touch release) and calculates an input position.

In the meantime, the touch panel is combined with a display screen 30. The display screen is a general display device, such as a liquid crystal display (LCD), a plasma display panel (PDP), a cathode ray tube (CRT), or the like, which is a part for displaying an image to be outputted to a user.

In addition, in the specific embodiment of the present invention, the display screen 30, which is a part for displaying a touch position to the user, displays a character to be inputted when the touch panel is touched and displays an area where the character is assigned.

Meanwhile, the display screen 30 is connected to a display controller 40 for controlling the display screen 30. The display controller 40 is a part for changing an image to be displayed on the display screen 30 depending on a command of a control unit 50 and an input mode that will be described below.

The control unit 50 for controlling the touch panel controller 20 and the display controller 40 is connected to the touch panel controller 20 and the display controller 40. That is, the control unit 50 initially arranges and displays characters to be inputted on the display and then changes and displays arrangement of the characters in response to a user's input.

In addition, the control unit 50 serves to receive the fact and the position of the touch input (including a touch release input) of the user from the touch panel controller 20, search for a corresponding command, and change the display and input mode according to the corresponding command.

At this time, a specific example describing how the control unit 50 operates in response to a user's input will be described below.

In the meantime, the control unit 50 is connected with a storage unit 60 for storing information on how the control unit 50 controls the touch panel controller 20 and the display controller 40 depending on a user's touch input.

Hereinafter, a specific control method of the control unit 50 for controlling the touch panel controller 20 and the display controller 40 will be described. Here, the control of the touch panel 10 and the display controller 40 is controlling the touch panel 10 and the display screen 30 through the touch panel controller 20 and the display controller 40.

Before describing the control method of the control unit 50, some terminologies are defined for convenience of explanation, and the method will be described using some defined terminologies. Examples of referenced items may be found in the figures.

First, an array position 70 is a partitioned area to which a character is assigned in a character input mode.

Then, an expansion event is an input command for selecting one of array positions 70.

In addition, a selection position 90 is an area on the touch screen, where a character assigned to the selected array position 70 is rearranged when the expansion event is inputted.

Then, a selection event is an event of selecting a character by selecting one of selection positions 90.

At this time, the character selected and inputted by the selection event is referred to as an input character.

First, in the character input mode, the control unit 50 divides the touch screen into a plurality of array positions 70. Then, one or more characters are assigned to each of the array positions 70. At this time, the array positions 70 may be arranged in a rectangular form of n×m or in a square form of n×n.

Then, if an expansion event is sensed from one of the array positions 70, the control unit 50 rearranges the characters assigned to the sensed array position 70, from which the expansion event is sensed, on the selection positions 90.

At this time, the expansion event is generated when the user touches a corresponding area.

In the meantime, upon observing a response state of the controller according to the user's touch input, if the touch input is normally made within an area, the character within the area is recognized to be inputted without a problem.

However, if two adjacent array positions are touched (when a border line is touched), first, 1) it may be determined that any touch is not made. Alternatively, 2) the touched areas are compared, and an array position which is comparatively broader among the two touched array positions may be determined as being selected. Alternatively, 3) a message for requesting to confirm which of the two array positions is the selected array position may be displayed to the user.

Then, the selection positions 90 are set as many as the characters assigned to the array position 70 selected by the expansion event. The selection positions 90 may be set randomly or with a specific rule.

Specific examples of the rule for setting the selection positions 90 will be described. The selection positions 90 may be formed to expand in directions including one or more of the up, down, left, and right sides from the point where the expansion event is generated; in directions including one or more of the up, down, and left sides from the point where the expansion event is generated; or in directions including one or more of the up, left, and right sides from the point where the expansion event is generated. Alternatively, the selection positions 90 may be formed to expand in directions including one or more of the up and left sides from the point where the expansion event is generated.

If the selection positions 90 are formed to expand in four directions of up, down, left, and right sides, there is an advantage in that the number of the selection positions 90 that can be arranged on the touch screen is increased.

Then, if the selection positions 90 are formed to expand in two directions of up and left sides, there is an advantage in that the screen can be prevented from being shielded with the user's hand when the user touches the touch screen. It is apparent that this is for general right-handed users, and a direction to the right can be set instead of a direction to the left for left-handed users. However, in this case, there is a disadvantage in that the number of selection positions 90 that can be arranged is small.

Accordingly, a method into which the aforementioned methods are combined may be used in consideration of the number of characters to be arranged, and the second and third methods are examples of the combined method.

Then, if a selection event is generated from the touch panel 10, the control unit 50 recognizes a character assigned to the selection position 90 where the selection event is generated as the input character and then processes the input.

At this time, if the selection event is generated from an area out of the selection positions 90, the control unit 50 recognizes the selection event as a command for canceling the input character and then cancels the input of the character.

In the meantime, if the input of the character is completed or cancelled, the control unit 50 restores the touch screen to a waiting state of an initial character input mode.

Here, the input event may be generated by a touch release of the user or by touching the touch panel 10 by the user.

That is, the selection positions 90 are set by an expansion event generated by touching the array position 70, and the selection event may be generated by releasing the touch after selecting one of the selection positions 90 by dragging the touch while the touch is maintained. Alternatively, the expansion event and the selection event may be generated by separate touches.

In the meantime, the control unit 50 may be connected to the storage unit 60 for storing information on settings of the array positions 70 and the selection positions 90 and information on settings of expansion events and selection events.

The storage unit 60 stores forms of the array positions 70 differently set by the type of characters, such as English characters, Korean characters, numerals, and the like, as well as assigned characters, display information, and the like. Then, the storage unit stores an execution command corresponding to an expansion event for each of the array positions 70 when the expansion event is inputted. In addition, the storage unit also stores information on the form of each selection position 90 and characters arranged on the selection position. The storage unit also stores an execution command corresponding to a selection event for each of the selection position 90.

Hereinafter, the operation of the touch screen device according to the present invention will be described in detail through the method of inputting a character.

Figure 2:
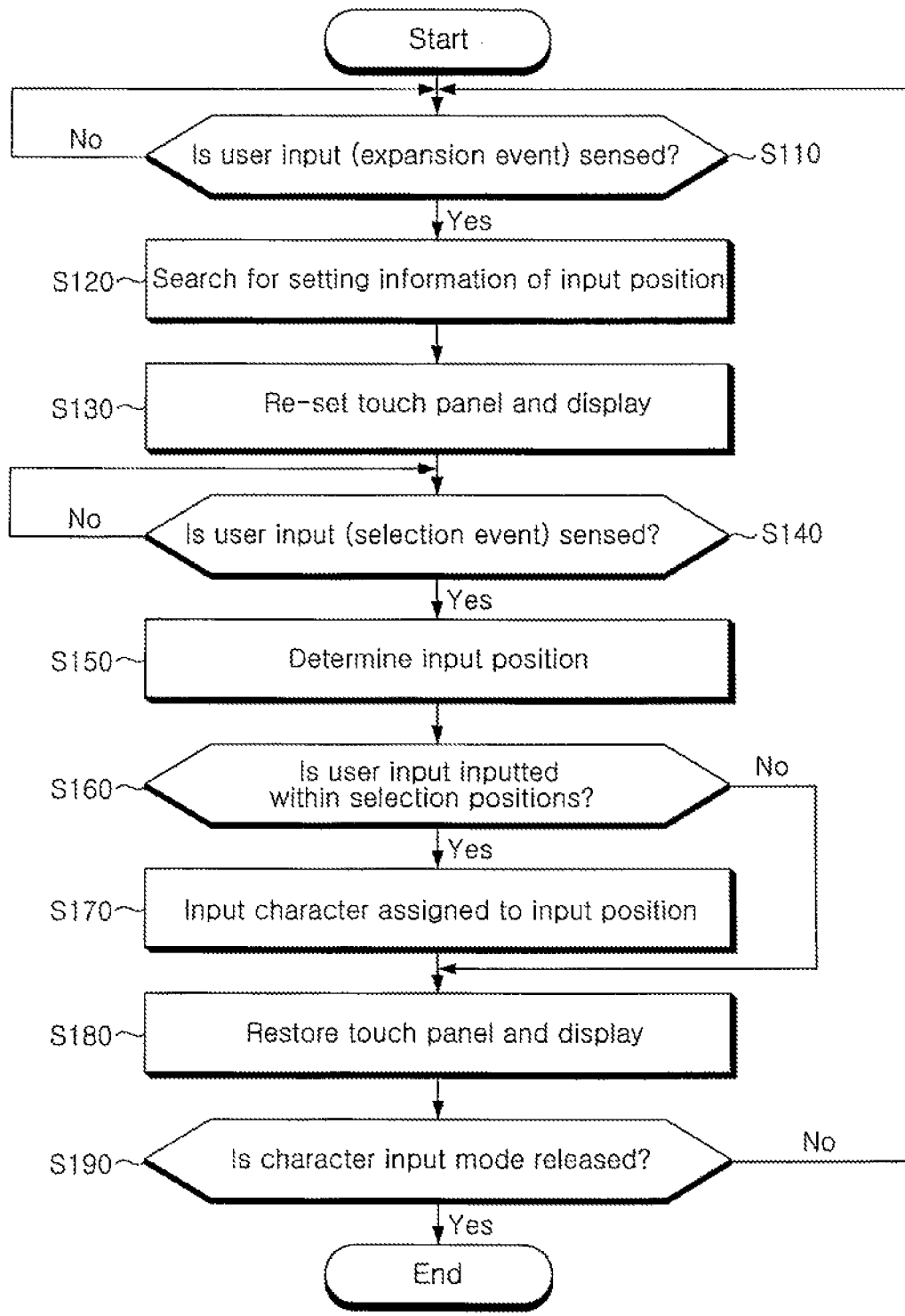
FIG. 2 is a flowchart illustrating a method of inputting a character the touch screen device according to the specific embodiment of the present invention.

FIG. 2 is a flowchart illustrating a method of inputting a character in the touch screen device according to the specific embodiment of the present invention.

As shown in the figure, the method of inputting a character according to a specific embodiment of the present invention first determines whether an expansion event is sensed by a user. The expansion event is generated by a user's touch as described above (step S110).

The present invention, which relates to a method of inputting a character on a touch screen, will be described basically assuming that the touch screen device is in a character input mode. At this time, the touch screen is in a character input waiting state, and the array positions 70 are set as described above.

Next, the control unit 50 searches for execution information corresponding to the position where the expansion event is generated (step S120). At this time, the execution information can be searched from the information stored in the storage unit 60. The execution information includes all of setting information on the manner of arranging the selection positions 90 in correspondence with the expansion event and on characters to be assigned to each of the arranged selection positions 90 together with the manner of assigning the characters to the selection positions.

Then, the touch panel 10 and the display are set again based on the searched execution information (step S130). That is, the selection positions 90 are arranged on the touch screen, and corresponding characters are assigned.

Thereafter, it is determined whether a selection event is inputted by the user (step S140). The selection event may be a touch or a touch release of the user as described above.

After the selection event is sensed, the input position of the selection event is determined (step S150).

At this time, it is determined whether the input position of the selection event is within the selection positions 90. If the input position of the selection event is within the selection positions 90, a character set to the position where the selection event is generated is recognized as an input character, and the character is inputted (step S170).

If the input character is inputted or the selection event is generated out of the selection positions 90, display settings of the touch panel 10 and the display screen 30 are restored to the settings of the character input waiting state (step S180). At this time, the restoration means returning the settings to the settings of the initial character input waiting state.

Thereafter, it is determined whether the character input mode is released, and execution of the present invention is terminated if the character input mode is released, whereas the touch screen device waits for input of a new character if the character input mode is continued (step S190).

Here, the method of combining inputted characters and constructing a syllable, a word, or the like is the same as a known prior art.

Hereinafter, examples of the present invention, in which the specific embodiment of the present invention is practically employed and operates on a touch screen, will be described in detail with reference to the accompanying drawings.

FIGS. 3*a* to 3*d* are exemplary views showing operating states of a first application example of the present invention.

Figure 3A:
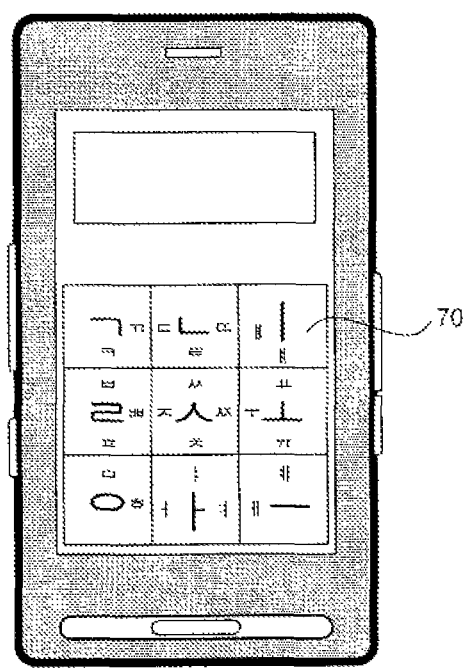
FIGS. 3a to 3d are exemplary views showing operating states of a first application example of the present invention.

FIG. 3*a* is a view showing the array positions 70 of the first application example. Korean letters are inputted in the first application example, and the array positions 70 are formed in a 3×3 matrix.

At this time, the array positions (AP) are respectively expressed as AP (1, 1) to AP (3, 3) for convenience of explanation.

In the array positions 70, three or less letters are assigned to AP(1, 1), four or less letters are assigned to AP(1, 2), three or less letters are assigned to AP(1, 3), four or less letters are assigned to AP(2, 1), five or less letters are assigned to AP(2, 2), four or less letters are assigned to AP(2, 3), three or less letters are assigned to AP(3, 1), four or less letters are assigned to AP(3, 2), and three or less letters are assigned to AP(3, 3).

Then, Korean consonants and vowels are sequentially assigned to the array positions 70. In other embodiments, other non-English symbols (e.g., Arabic, Chinese, Kangi, etc.) may be used. Thus, a person conversant with these non-English alphabets may practice the invention in the alphabet of their choice.

Upon describing an example of arranging the Korean letters, as shown in FIG. 3a, ㄱ, ㅋ and ㄲ are assigned to AP(1, 1); ㄴ, ㄷ, ㅌ and ㄸ are assigned to AP(1, 2); ㅏ, ㅐ and ㅒ are assigned to AP(1, 3); ㄹ, ㅂ, ㅍ and ㅃ are assigned to AP(2, 1); ㅅ, ㅈ, ㅊ, ㅆ and ㅉ are assigned to AP(2, 2); ㅗ, ㅜ, ㅛ and ㅠ are assigned to AP(2, 3); ㅇ, ㅁ and ㅎ are assigned to AP(3, 1); ㅓ, ㅕ, ㅑ and ㅔ are assigned to AP(3, 2); and ㅡ, and ㅢ ㅖ are assigned to AP(3, 3).

At this time, although there are a variety of methods for displaying the letters, a representative letter among the assigned letters may be displayed in a large size, and the other letters may be arranged in a small size, as shown in the figure.

At this time, if one of the array positions 70 is touched, selection positions 90 are set in response to the touch. The selection positions 90 are formed to expand in the directions including one or more of the up, down, left and right sides from the position where the expansion event is generated.

Upon describing the expansions one by one, the selection positions 90 are formed at the position of AP(1, 1) and to expand to the down and right sides therefrom if the expansion event is generated at AP(1, 1); at the position of AP(1, 2) and to the down, left and right sides therefrom if the expansion event is generated at AP(1, 2); at the position of AP(1, 3) and to the down and left sides therefrom if the expansion event is generated at AP(1, 3); at the position of AP(2, 1) and to the up, down and right sides therefrom if the expansion event is generated at AP(2, 1); at the position of AP(2, 2) and to the up, down, left and right sides therefrom if the expansion event is generated at AP(2, 2); at the position of AP(2, 3) and to the up, down and left sides therefrom if the expansion event is generated at AP(2, 3); at the position of AP(3, 1) and to the up and right sides therefrom if the expansion event is generated at AP(3, 1); at the position of AP(3, 2) and to the up, left and right sides therefrom if the expansion event is generated at AP(3, 2); and at the position of AP(3, 3) and to the up and left sides therefrom if the expansion event is generated at AP(3, 3).

Figure 3B:
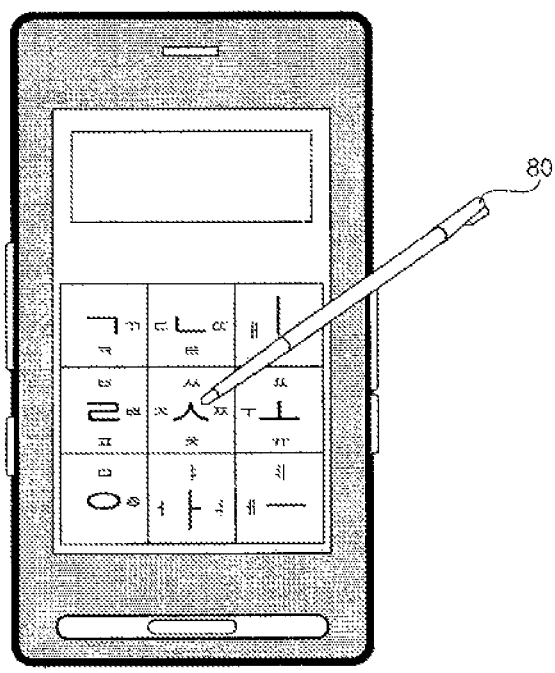
Figure 3C:
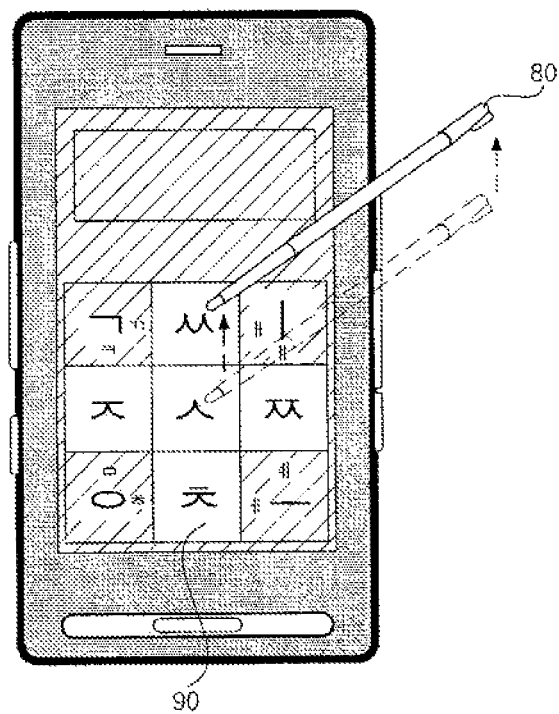

For example, if "ㅅ" is touched as shown in FIG. 3b, five selection positions 90 are set by expanding to the up, down, left, and right sides from "ㅅ" as shown in FIG. 3c, and "ㅅ", "ㅈ", "ㅊ", "ㅆ" and "ㅉ" are respectively assigned to the selection positions.

Figure 3D:
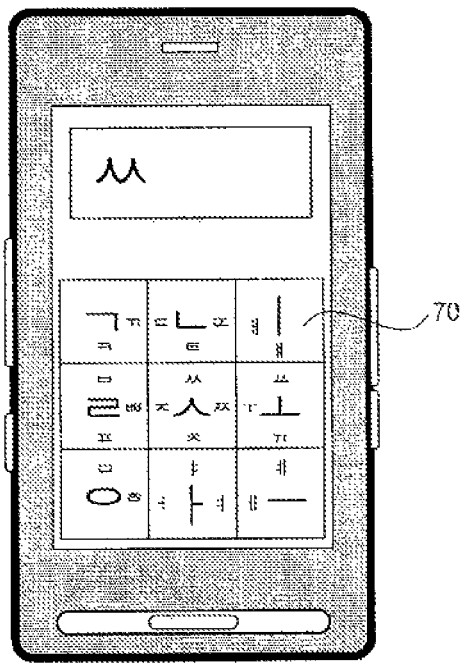

Thereafter, while being touched on "ㅅ", a stylus pen 80 is dragged to the position of "ㅆ". Then, if the stylus pen 80 releases the touch at the position of "ㅆ" (a selection event is generated), "ㅆ" is inputted as shown in FIG. 3d. A finger or another device may be used in place of the stylus pen 80.

At this time, it is apparent that if the stylus pen 80 releases the touch out of the selection positions 90 (at the shaded area), the input of the letter is cancelled, and the touch screen device is transferred to the initial waiting mode (FIG. 3a).

In addition, the selection event may be generated by separate touches as described above.

Figure 4A:
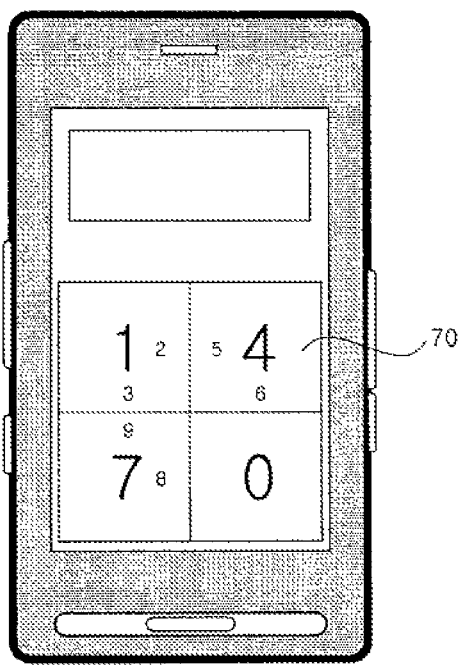
FIGS. 4a to 4b are exemplary views showing operating states of a second application example of the present invention.
Figure 4B:
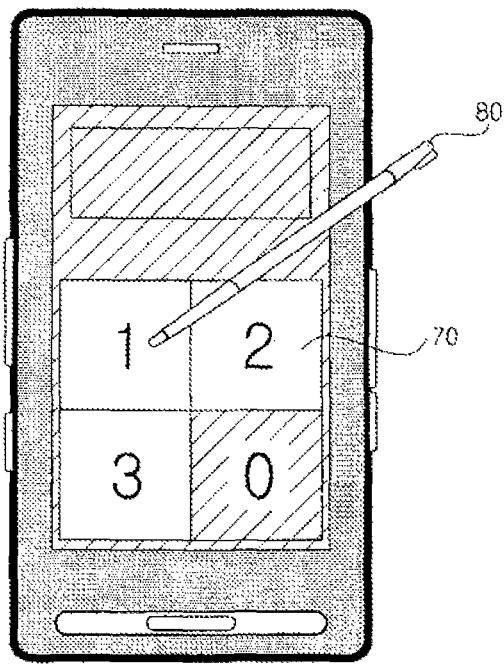

FIGS. 4a to 4b are exemplary views showing operating states of a second application example of the present invention.

FIG. 4a is a view showing the array positions 70 of the second application example. Numerals are inputted in the second application example, and the array positions 70 are formed in a 2×2 matrix.

In the array positions 70, three or less characters are assigned to AP(1, 1), three or less characters are assigned to AP(1, 2), three or less characters are assigned to AP(2, 1), and three or less characters are assigned to AP(2, 2).

Then, as shown in FIG. 4a, in the array positions 70, numerals 1, 2, and 3 are assigned to AP(1, 1); numerals 4, 5, and 6 are assigned to AP(1, 2); numerals 7, 8, and 9 are assigned to AP(2, 1); and numeral 0 is assigned to AP(2, 2).

At this time, the arrangement of the selection positions 90 is set in the same manner as the first application example. Then, if "1" is selected among the array positions 70, selection positions are set as shown in FIG. 4b.

Then, a selection event is generated, and a character is inputted in the same manner as described above.

FIGS. 5a to 5d are exemplary views showing operating states of a third application example of the present invention.

Figure 5A:
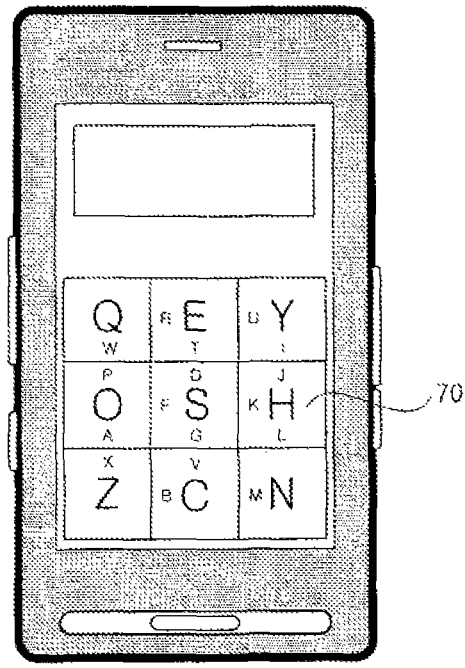
FIGS. 5a to 5d are exemplary views showing operating states of a third application example of the present invention.

FIG. 5a is a view showing the array positions 70 of the third application example. English letters are inputted in the third application example, and the array positions 70 are formed in a 3×3 matrix.

At this time, in the array positions 70, two or less letters are assigned to AP(1, 1), three or less letters are assigned to AP(1, 2), three or less letters are assigned to AP(1, 3), three or less letters are assigned to AP(2, 1), four or less letters are assigned to AP(2, 2), four or less letters are assigned to AP(2, 3), two or less letters are assigned to AP(3, 1), three or less letters are assigned to AP(3, 2), and two or less letters are assigned to AP(3, 3).

English letters are arranged in the sequence of the QWERTY array, wherein the sequence of the QWERTY array means the sequence of letters arranged on a keyboard.

In the array positions 70, Q and W are assigned to AP(1, 1); E, R and T are assigned to AP(1, 2); Y, U and I are assigned to AP(i, 3); O, P and A are assigned to AP(2, 1); S, D, F and G are assigned to AP(2, 2); H, J, K and L are assigned to AP(2, 3); Z and X are assigned to AP(3, 1); C, V and B are assigned to AP(3, 2); and N and M are assigned to AP(3, 3).

At this time, if one of the array positions 70 is touched, selection positions 90 are set in response to the touch. The selection positions 90 are formed to expand in one or more directions including the up, down and left sides from the position where the expansion event is generated.

Upon describing the expansions one by one, the selection positions 90 are formed at the position of AP(1, 1) and to expand to the down side therefrom if the expansion event is generated at AP(1, 1); at the position of AP(1, 2) and to the left and down sides therefrom if the expansion event is generated at AP(1, 2); at the position of AP(1, 3) and to the left and down sides therefrom if the expansion event is generated at AP(1, 3); at the position of AP(2, 1) and to the up and down sides therefrom if the expansion event is generated at AP(2, 1); at the position of AP(2, 2) and to the up, down and left sides therefrom if the expansion event is generated at AP(2, 2); at the position of AP(2, 3) and to the up, down and left sides therefrom if the expansion event is generated at AP(2, 3); at the position of AP(3, 1) and to the up side therefrom if the expansion event is generated at AP(3, 1); at the position of AP(3, 2) and to the up and left sides therefrom if the expansion event is generated at AP(3, 2); and at the position of AP(3, 3) and to the left side therefrom if the expansion event is generated at AP(3, 3).

Figure 5B:
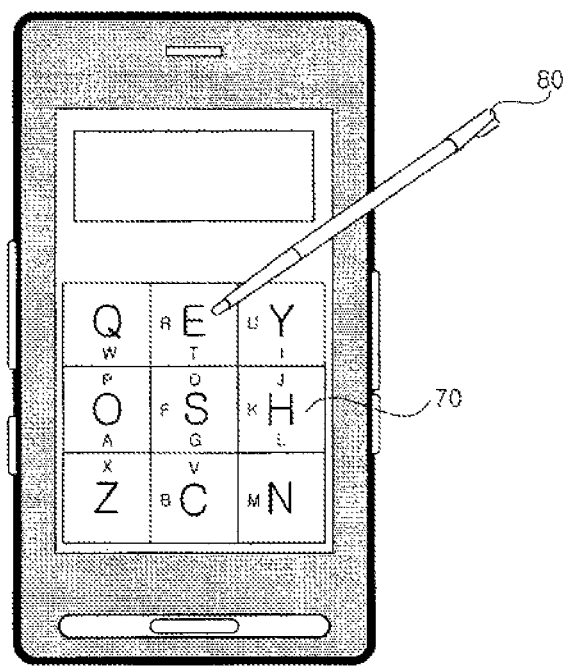
Figure 5C:
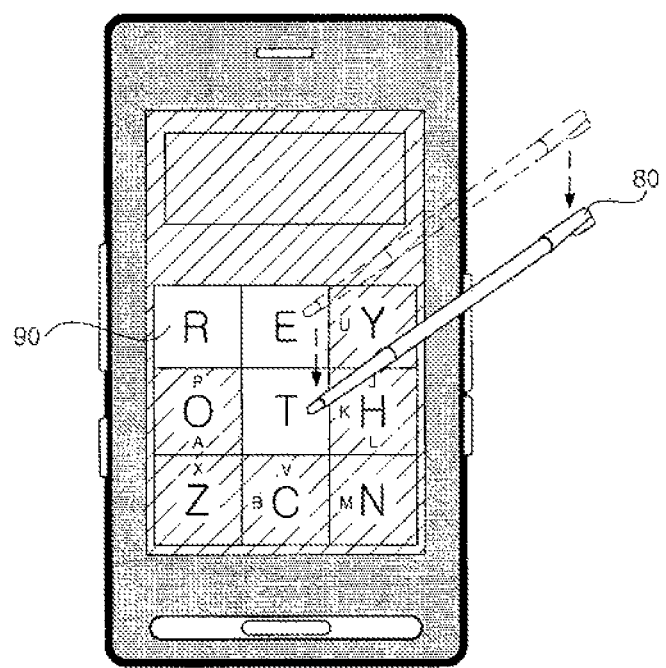

For example, if "E" is touched as shown in FIG. 5b, four selection positions 90 are set by expanding to the left, right and down sides from "E" as shown in FIG. 5c, and E, R, Y and T are respectively assigned to the selection positions.

Figure 5D:
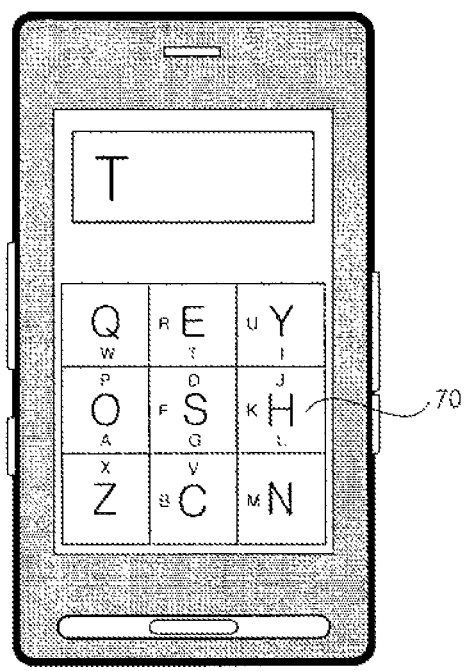

Thereafter, while being touched on "E", the stylus pen 80 is dragged to the position of "T". Then, if the stylus pen 80 releases the touch at the position of "T" (a selection event is generated), "T" is inputted as shown in FIG. 5*d*.

At this time, it is apparent that if the stylus pen 80 releases the touch out of the selection positions 90, the input of the letter is cancelled, and the touch screen device is transferred to the initial waiting mode, which is the same as described above.

In addition, the selection event may be generated by separate touches as described above.

Figure 6:
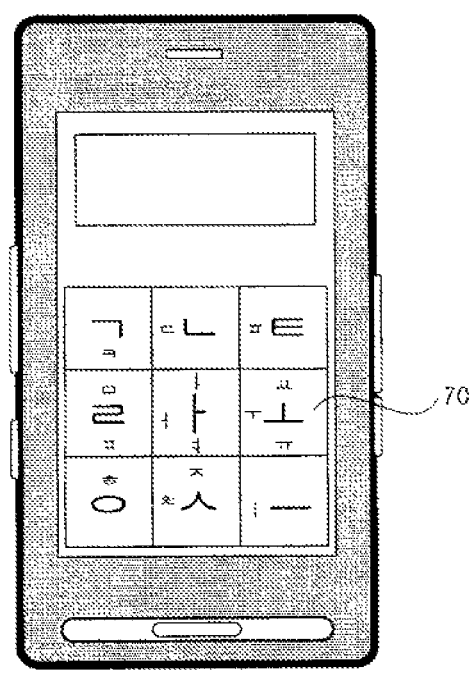
FIG. 6 is an exemplary view showing an operating state of a fourth application example of the present invention.

FIG. 6 is an exemplary view showing an operating state of a fourth application example of the present invention.

Korean letters are inputted in the fourth application example in the same manner as the third application example, and Korean consonants and vowels are sequentially assigned.

In the array positions 70, ㄱ and ㄲ are assigned to AP(1, 1); ㄴ and ㄷ are assigned to AP(1, 2); ㄸ and ㄹ are assigned to AP(1, 3); ㅁ, ㅂ and ㅃ are assigned to AP(2, 1); ㅏ, ㅓ, ㅑ and ㅕ are assigned to AP(2, 2); ㅗ, ㅜ, ㅛ and ㅠ are assigned to AP(2, 3); ㅇ and ㅎ are assigned to AP(3, 1); ㅅ, ㅈ and ㅊ are assigned to AP(3, 2); ㅡ and ㅣ are assigned to AP(3, 3).

Figure 7:
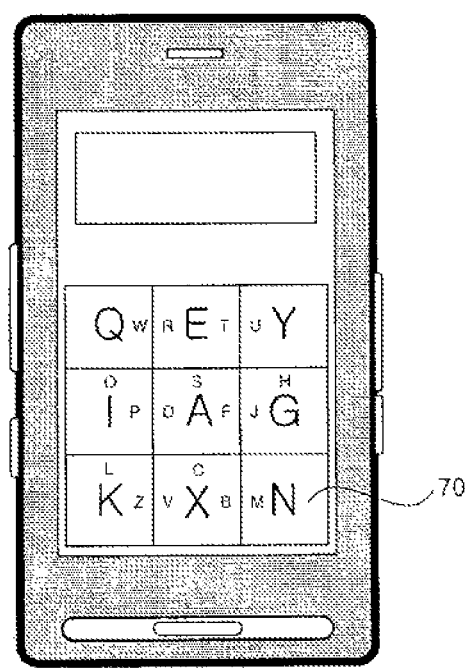
FIG. 7 is an exemplary view showing an operating state of a fifth application example of the present invention.

FIG. 7 is an exemplary view showing an operating state of a fifth application example of the present invention.

At this time, the fifth application example is formed in a 3×3 matrix, and in the array positions 70, two or less letters are assigned to AP(1, 1), three or less letters are assigned to AP(1, 2), two or less letters are assigned to AP(1, 3), three or less letters are assigned to AP(2, 1), four or less letters are assigned to AP(2, 2), three or less letters are assigned to AP(2, 3), three, or less letters are assigned to AP(3, 1), four or less letters are assigned to AP(3, 2), and two or less letters are assigned to AP(3, 3).

Upon describing further specifically, in the array positions 70, Q and W are assigned to AP(1, 1); E, R and T are assigned to AP(1, 2); Y and U are assigned to AP(1, 3); I, O and P are assigned to AP(2, 1); A, S, D and F are assigned to AP(2, 2); G, H and J are assigned to AP(2, 3); K, L and Z are assigned to AP(3, 1); X, C, V and B are assigned to AP(3, 2); and N and M are assigned to AP(3, 3).

At this time, although it is not shown in the figure, the selection positions 90 are formed to expand in one or more directions including the up, left and right sides from the position where the expansion event is generated.

Upon describing further specifically, the selection positions 90 are formed at the position of AP(1, 1) and to expand to the right side therefrom if the expansion event is generated at AP(1, 1); at the position of AP(1, 2) and to the left and right sides therefrom if the expansion event is generated at AP(1, 2); at the position of AP(1, 3) and to the left side therefrom if the expansion event is generated at AP(1, 3); at the position of AP(2, 1) and to the up and right sides therefrom if the expansion event is generated at AP(2, 1); at the position of AP(2, 2) and to the up, left and right sides therefrom if the expansion event is generated at AP(2, 2); at the position of AP(2, 3) and to the up and left sides therefrom if the expansion event is generated at AP(2, 3); at the position of AP(3, 1) and to the up and right sides therefrom if the expansion event is generated at AP(3, 1); at the position of AP(3, 2) and to the up, left and right sides therefrom if the expansion event is generated at AP(3, 2); and at the position of AP(3, 3) and to the left side therefrom if the expansion event is generated at AP(3, 3).

Figure 8:
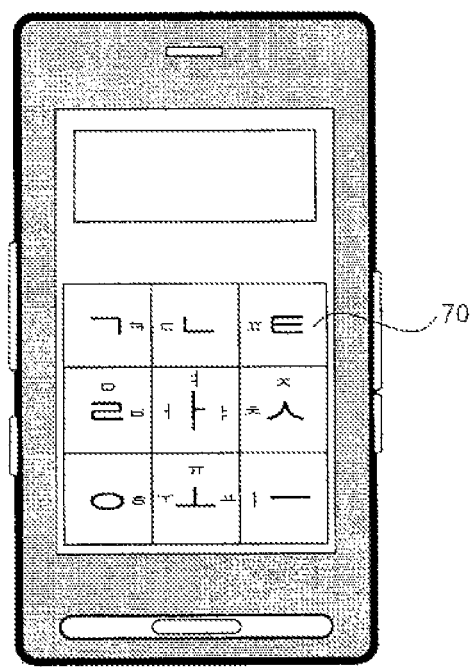
FIG. 8 is an exemplary view showing an operating state of a sixth application example of the present invention.

In the meantime, FIG. 8 is an exemplary view showing an operating state of a sixth application example of the present invention, wherein the sixth application example is an example where Korean letters are assigned in the same manner as the fifth application example.

In the sixth application example, in the array positions 70, ㄱ and ㄲ are assigned to AP(1, 1); ㄴ and ㄷ are assigned to AP(1, 2); ㄸ and ㄹ are assigned to AP(1, 3); ㅁ, ㅂ and ㅃ are assigned to AP(2, 1); ㅏ, ㅓ, ㅑ and ㅕ are assigned to AP(2, 2); ㅅ, ㅈ and ㅊ are assigned to AP(2, 3); ㅇ and ㅎ are assigned to AP(3, 1); ㅗ, ㅜ, ㅛ and ㅠ are assigned to AP(3, 2); and ㅡ and ㅣ are assigned to AP(3, 3).

FIGS. 9*a* to 9*h* are exemplary views showing operating states of a seventh application example of the present invention.

English letters are arranged in the seventh application example, and the array positions 70 are formed in a 3×3 matrix, in which three or less letters are assigned to AP(1, 1), four or less letters are assigned to AP(1, 2), three or less letters are assigned to AP(1, 3), two or less letters are assigned to AP(2, 1), four or less letters are assigned to AP(2, 2), three or less letters are assigned to AP(2, 3), two or less letters are assigned to AP(3, 1), three or less letters are assigned to AP(3, 2), and two or less letters are assigned to AP(3, 3).

In the array positions 70, Q, W and E are assigned to AP(1, 1); R, T, Y and U are assigned to AP(1, 2); I, O and P are assigned to AP(1, 3); A and S are assigned to AP(2, 1); D, F, G and H are assigned to AP(2, 2); J, K and L are assigned to AP(2, 3); Z and X are assigned to AP(3, 1); C, V and B are assigned to AP(3, 2); and N and M are assigned to AP(3, 3).

In the meantime, in the seventh application example, the selection positions 90 are formed at the position of AP(1, 1) and to expand to the up and right sides therefrom if the expansion event is generated at AP(1, 1); at the position of AP(1, 2) and to the up, left and right sides therefrom if the expansion event is generated at AP(1, 2); at the position of AP(1, 3) and to the up and left sides therefrom if the expansion event is generated at AP(1, 3); at the position of AP(2, 1) and to the up side therefrom if the expansion event is generated at AP(2, 1); at the position of AP(2, 2) and to the up, left and right sides therefrom if the expansion event is generated at AP(2, 2); at the position of AP(2, 3) and to the up and left sides therefrom if the expansion event is generated at AP(2, 3); at the position of AP(3, 1) and to the up side therefrom if the expansion event is generated at AP(3, 1); at the position of AP(3, 2) and to the up and left sides therefrom if the expansion event is generated at AP(3, 2); and at the position of AP(3, 3) and to the up side therefrom if the expansion event is generated at AP(3, 3).

Figure 9A:
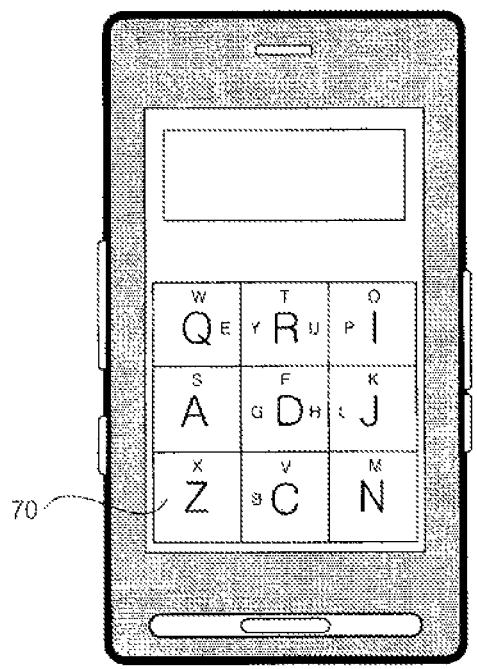
FIGS. 9a to 9b are exemplary views showing operating states of a seventh application example of the present invention.
Figure 9B:
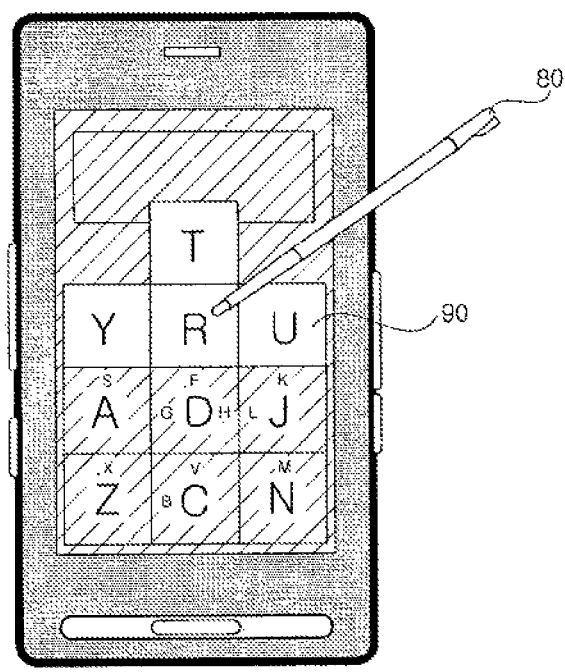

For example, if "R" is touched among the array positions 70 as shown in FIG. 9*b*, selection positions 90 are set to the up, left and right sides from "R", and T, Y and U are respectively assigned to the up, left and right sides.

Then, the selection event and the method of inputting a character are the same as described above.

Figure 10:
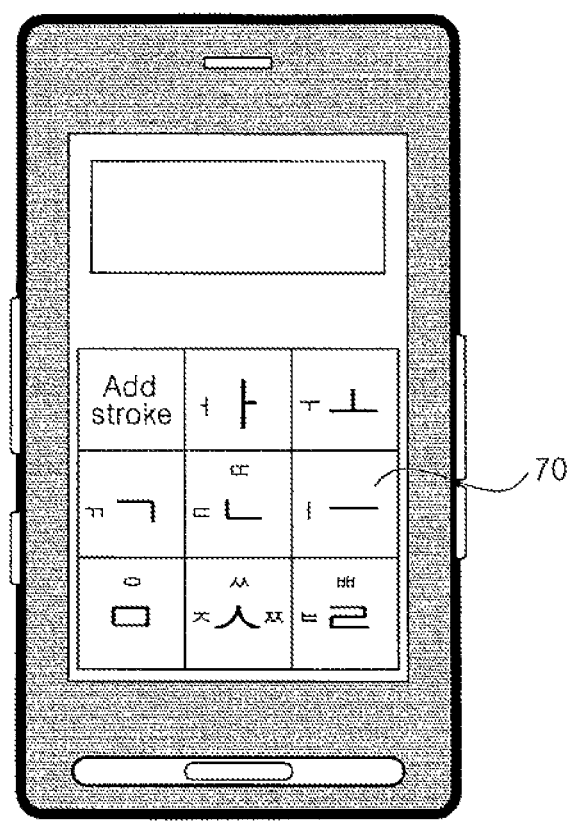
FIG. 10 is an exemplary view showing an operating state of an eighth application example of the present invention.

FIG. 10 is an exemplary view showing an operating state of an eighth application example of the present invention.

In the eighth application example, the array positions 70 are formed in a 3×3 matrix, in which one character is assigned to AP(1, 1), two or less letters are assigned to AP(1, 2), two or less letters are assigned to AP(1, 3), two or less letters are assigned to AP(2, 1), three or less letters are assigned to AP(2, 2), two or less letters are assigned to AP(2, 3), two or less letters are assigned to AP(3, 1), four or less letters are assigned to AP(3, 2), and three or less letters are assigned to AP(3, 3).

At this time, the input characters are Korean letters, and Korean consonants and vowels are sequentially assigned to the array positions 70.

Then, in the array positions 70, an "Add a stroke" button is assigned to AP(1, 1); ㅏ and ㅓ are assigned to AP(1, 2); ㅗ and ㅜ are assigned to AP(1, 3); ㄱ and ㄲ are assigned to AP(2, 1); ㄴ, ㄷ and ㄸ are assigned to AP(2, 2); ㅡ and ㅣ are assigned to AP(2, 3); ㅁ and ㅇ are assigned to AP(3, 1); ㅅ, ㅈ, ㅆ and ㅉ are assigned to AP(3, 2); and ㄹ, ㅂ and ㅃ are assigned to AP(3, 3). The "add a stroke" button allows a user to add a stroke symbol as a displayed symbol. Other symbols may be used as an added symbol.

Although the selection positions 90 are intended to expand to the up and left sides from the selected array position 70 in the eighth application example, four letters are assigned to AP(3, 2) in order to set an array for convenience of users, and selection positions 90 are set to the up, left and right sides only from the selected array position.

It is apparent that the position of the selection position 90 to which four letters are assigned may be differently set.

Accordingly, in the eighth application example, the selection position 90 is the position of AP(1, 1) if the expansion event is generated at AP(1, 1); and the selection positions 90 are formed at the position of AP(1, 2) and to expand to the left side therefrom if the expansion event is generated at AP(1, 2); at the position of AP(1, 3) and to the left side therefrom if the expansion event is generated at AP(1, 3); at the position of AP(2, 1) and to the left side therefrom if the expansion event is generated at AP(2, 1); at the position of AP(2, 2) and to the up and left sides therefrom if the expansion event is generated at AP(2, 2); at the position of AP(2, 3) and to the left side therefrom if the expansion event is generated at AP(2, 3); at the position of AP(3, 1) and to the up side therefrom if the expansion event is generated at AP(3, 1); at the position of AP(3, 2) and to the up, left, and right sides therefrom if the expansion event is generated at AP(3, 2); and at the position of AP(3, 3) and to the up and left sides therefrom if the expansion event is generated at AP(3, 3).

In the specific embodiment of the invention described above, it has been described that expansion directions and the number of the selection positions are predetermined, and accordingly, the number of characters assigned to each of the array positions and the forms of the array positions are determined.

However, according to another aspect of the present invention, the touch screen is partitioned into array positions of a matrix form, and one or more characters are assigned to each of the partitioned array positions. At this time, the characters are arranged so that relatively large-sized one of the characters is arranged at the center of the partitioned array position, and the other characters are arranged at one or more positions of the up, down, left and right sides centering on the large-sized character.

In addition, expansion of the array position depends on the directions and the number of the assigned characters. That is, the expansion is performed from the position of the character arranged at the center toward the directions where the other characters are arranged, and the other characters is respectively assigned to the expanding selection positions and displayed on the selection position. At this time, it is apparent that the characters may be displayed in the same size.

The touch panel of the present invention may be included in a wireless communication device (e.g., cell phone) or a personal data assistant (FDA) configured to communicate with another device via a network (e.g., a CDMA, Bluetooth or other wireless network).

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

The scope of the present invention is not limited to the embodiments described above but is defined by the appended claims. It will be apparent that those skilled in the art can make various modifications and changes thereto within the scope of the invention defined by the claims.

What is claimed is:

1. A mobile terminal, comprising:
   a touch screen configured to display a touch keypad, said touch keypad including character input regions, at least one specific character input region including a first character symbol and a second character symbol, and to display an output window above the touch keypad, said output window displaying character symbols touched on the character input regions; and
   a controller configured to:
   receive a touch selection signal indicating a touch selection of the specific character input region,
   as long as the received touch selection signal is received, display a new character input region with the second character symbol being displayed larger than the second character symbol displayed in the specific character input region, and
   display the second character symbol in the output window when the touch selection is released from the new character input region,
   wherein the character input regions in a top row of the touch keypad are numbers,
   wherein all numeral first character symbols in the top row do not have non-numeral character symbols, and
   wherein all alphabet first character symbols displayed in the touch keypad have at least one second character symbol.

2. The mobile terminal as claimed in claim 1, wherein, prior to the touch selection signal being received, the controller is further configured to display the first character symbol larger than the second character symbol.

3. The mobile terminal as claimed in claim 1, wherein the output window is separated from the touch keypad by a blank non-input region.

4. The mobile terminal as claimed in claim 1, wherein when said specific character input region is at a top row of the touch keypad, the controller is further configured to new character input region with the larger second character symbol partially overlapping the output window.

5. The mobile terminal as claimed in claim 1, wherein the controller is further configured to no longer display the touch keypad and the new character input region when the touch selection is released.

6. The mobile terminal as claimed in claim 1, wherein the larger second character symbol is displayed in a single character input region by itself.

7. A method of controlling a mobile terminal, the method comprising:
- displaying a touch keypad on a touch screen of the mobile terminal, said touch keypad including character input regions, at least one specific character input region including a first character symbol and a second character symbol;
- displaying an output window above the touch keypad, said output window displaying character symbols touched on the character input regions;
- receiving a touch selection signal indicating a touch selection of the specific character input region;
- as long as the received touch selection signal is received, displaying a new character input region with the second character symbol being displayed larger than the second character symbol displayed in the specific character input region; and
- displaying the second character symbol in the output window when the touch selection is released from the new character input region,
- wherein the character input regions in a top row of the touch keypad are numbers,
- wherein all numeral first character symbols in the top row do not have non-numeral character symbols, and
- wherein all alphabet first character symbols displayed in the touch keypad have at least one second character symbol.

8. The method as claimed in claim 7, wherein, prior to the touch selection signal being received, the first character symbol is displayed larger than the second character symbol.

9. The method as claimed in claim 7, wherein the output window is separated from the touch keypad by a blank non-input region.

10. The method as claimed in claim 7, wherein when said specific character input region is at a top row of the touch keypad, the new character input region with the larger second character symbol is displayed to partially overlap the output window.

11. The method as claimed in claim 7, wherein the touch keypad and the new character input region are no longer displayed when the touch selection is released.

12. The method as claimed in claim 7, wherein the larger second character symbol is displayed in a single character input region by itself.

* * * * *